United States Patent
Wickenkamp (10) Patent No.: US 9,734,244 B2
(45) Date of Patent: Aug. 15, 2017

(54) METHODS AND SYSTEMS FOR PROVIDING SERENDIPITOUS RECOMMENDATIONS

(71) Applicant: Rovi Guides, Inc., Santa Clara, CA (US)

(72) Inventor: Vanessa Wickenkamp, Elmhurst, IL (US)

(73) Assignee: Rovi Guides, Inc., San Carlos, CA (US)

( * ) Notice: Subject to any disclaimer, the term of this patent is extended or adjusted under 35 U.S.C. 154(b) by 139 days.

(21) Appl. No.: 14/563,672

(22) Filed: Dec. 8, 2014

(65) Prior Publication Data

US 2016/0314203 A1    Oct. 27, 2016

(51) Int. Cl.
*G06K 7/10* (2006.01)
*G06F 17/30* (2006.01)

(52) U.S. Cl.
CPC .... *G06F 17/30828* (2013.01); *G06F 17/3053* (2013.01); *G06F 17/3084* (2013.01); *G06F 17/30867* (2013.01)

(58) Field of Classification Search
USPC ......................... 235/472.01, 375, 487, 462.45
See application file for complete search history.

(56) References Cited

U.S. PATENT DOCUMENTS

| | | | |
|---|---|---|---|
| 5,798,785 A | 8/1998 | Hendricks et al. | |
| 5,801,787 A | 9/1998 | Schein et al. | |
| 5,812,124 A | 9/1998 | Eick et al. | |
| 5,838,319 A | 11/1998 | Guzak et al. | |
| 5,991,735 A | * 11/1999 | Gerace | 705/7.33 |
| 6,005,565 A | 12/1999 | Legall et al. | |
| 6,008,803 A | 12/1999 | Rowe et al. | |
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 6,898,762 B2 | 5/2005 | Ellis et al. | |
| 7,165,098 B1 | 1/2007 | Boyer et al. | |
| 7,260,564 B1 | 8/2007 | Lynn et al. | |
| 7,630,986 B1 | * 12/2009 | Herz et al. | |
| 7,761,892 B2 | 7/2010 | Ellis et al. | |
| 7,890,499 B1 | 2/2011 | Boswell | |

(Continued)

OTHER PUBLICATIONS

"Videoanywhere: A system for searching and managing distributed heterogeneous video assets", Sigmod Record, 28(1):104-109 (Mar. 31, 1999) Sheth, A. et al.

(Continued)

*Primary Examiner* — Edwyn Labaze
(74) *Attorney, Agent, or Firm* — Ropes & Gray LLP (57) ABSTRACT

Systems and methods are described herein for returning search results that may be rare or surprising to what a user would expect a search performed on a user-input symbol would yield. As an example, if a user were searching for media related to the television show "It's Always Sunny in Philadelphia" by entering the search symbol "It's Always Sunny in Philadelphia," the user would typically expect the search results to yield media related to that television show. However, if the user's profile indicates that the user is fascinated by astronomy, for example, the search result may also yield a result corresponding to a documentary discussing the composition of the sun.

18 Claims, 4 Drawing Sheets

(56) References Cited

U.S. PATENT DOCUMENTS

| | | |
|---|---|---|
| 8,046,801 B2 | 10/2011 | Ellis et al. |
| 2002/0103920 A1 | 8/2002 | Berkun et al. |
| 2002/0174430 A1 | 11/2002 | Ellis et al. |
| 2003/0061610 A1 | 3/2003 | Errico |
| 2003/0110499 A1 | 6/2003 | Knudson et al. |
| 2004/0039734 A1 | 2/2004 | Judd et al. |
| 2005/0027691 A1 | 2/2005 | Brin et al. |
| 2005/0251827 A1 | 11/2005 | Ellis et al. |
| 2005/0278741 A1 | 12/2005 | Robarts et al. |
| 2006/0085826 A1 | 4/2006 | Funk et al. |
| 2006/0271953 A1 | 11/2006 | Jacoby et al. |
| 2008/0086456 A1 | 4/2008 | Rasanen et al. |
| 2009/0112647 A1 | 4/2009 | Volkert |
| 2010/0082585 A1 | 4/2010 | Barsook et al. |
| 2010/0153885 A1 | 6/2010 | Yates |
| 2014/0058833 A1* | 2/2014 | Ouimet et al. ............. 705/14.49 |
| 2015/0127565 A1* | 5/2015 | Chevalier et al. ..... G06Q 50/01 |

OTHER PUBLICATIONS

Youtube Website, "YouTube Homepage, Categories browsing", pp. 1-4, (Aug. 26, 2006) <http://web.archive_org/web/20060826163534/youtube_com/index>_.

\* cited by examiner

METHODS AND SYSTEMS FOR PROVIDING SERENDIPITOUS RECOMMENDATIONS

BACKGROUND

Search capabilities have become ubiquitous in applications of all sorts, ranging from capabilities of searching websites for information to searching a video application for video matching a search string. Typically, the search results that are returned are those deemed to be the most relevant results to a user based on how closely the data of the results matches the search string. The search capabilities of these applications, however, are lacking a feature for providing surprise search results that deviate from the spirit of the search string, and instead arise from a term of a search symbol that is counter to a user's typical search habits.

SUMMARY

Accordingly, systems and methods are described herein for returning search results that may be rare or surprising to what a user would expect a search performed on a user-input symbol would yield. As an example, if a user were searching for media related to the television show "It's Always Sunny in Philadelphia" by entering the search symbol "It's Always Sunny in Philadelphia," the user would typically expect the search results to yield media related to that television show. However, if the user's profile indicates that the user is fascinated by astronomy, for example, the search result may also yield a result corresponding to a documentary discussing the composition of the sun.

In some aspects, control circuitry may receive a symbol comprising a plurality of terms from a user. For example, control circuitry may prompt a user to enter a search string into a search bar, and control circuitry may interpret the individual words within the search string as the terms. As another example, the control circuitry may prompt a user to drag and drop a photograph into a search tool, where control circuitry may interpret metadata associated with the photograph, or patterns within the photograph itself, as the terms.

In some embodiments, control circuitry may retrieve a user profile associated with the user. For example, control circuitry may query a database for a user profile. Control circuitry may analyze the user profile to determine one or more attributes of the user profile that are pertinent to the symbol. For example, control circuitry may analyze the user profile to determine a frequency with which a particular term of the symbol is searched by the user. As another example, control circuitry may analyze the user profile to determine a current event in the user's life, and may determine whether that current event is associated with a term of the symbol.

In some embodiments, control circuitry may modify the symbol by applying a weight to each term of the plurality of terms based on an attribute of the user profile, where the applied weight is inversely correlated to a degree to which a respective term matches the attribute of the user profile. For example, if control circuitry identifies, as an attribute of the user profile, a frequency with which terms form a part of a search symbol, control circuitry may then apply a large weight to a term that is infrequently used, and may apply a small weight to a term that is frequently used. For instance, if control circuitry receives input of a search symbol of "It's Always Sunny in Philadelphia," control circuitry may cross-reference each word of the search symbol against a user profile to determine the frequency with which each word has been part of a search symbol. Control circuitry may determine that the word "Sunny" has been in very few search symbols, whereas the other words of the search symbol are frequently used. Control circuitry may therefore apply a substantial weight to the word "Sunny" and nominal or no weight to each other word.

In some embodiments, control circuitry may perform a search based on the modified symbol. For example, control circuitry may perform a search on the weighted symbol "It's Always Sunny on Philadelphia," where the word "Sunny" is weighted substantially higher than any other word in the symbol. Control circuitry may retrieve search results based on the performed search, and may generate for display the search results. Following the example above, control circuitry may generate for display a search result based on the word "Sunny." For example, if control circuitry determines that the user enjoys documentaries about astronomy, the control circuitry may return search results including documentaries about the sun. Control circuitry may additionally return search results for the unmodified search symbol, thus likely including search results related to the television program "It's Always Sunny in Philadelphia."

In some embodiments, control circuitry may apply a weight to terms of the search symbol based on a threshold value stored in memory. For example, control circuitry may retrieve the threshold from a database, and may also retrieve from the user profile a frequency indicator corresponding to how often a term of the symbol has been historically used. Control circuitry may determine whether the frequency indicator exceeds the threshold, where, when the frequency indicator does exceed the threshold, control circuitry applies a nominal weight, and where, when the frequency indicator does not exceed the threshold, control circuitry applies a substantial weight. For example, if control circuitry detects user entry of the symbol "It's Always Sunny in Philadelphia," control circuitry may determine a frequency in which each word of the symbol has been historically searched by the user. If control circuitry determines that all terms of the symbol "It's Always Sunny in Philadelphia" other than "Sunny" correspond to a frequency indicator that exceeds the threshold, control circuitry may apply a nominal weight to each of those terms, and may apply a substantial weight to the term "Sunny." This may cause control circuitry to retrieve and generate for display search results relating to the term "Sunny."

In some embodiments, control circuitry may determine the degree to which the respective term matches an attribute of a user profile based on a rating indicator. For example, control circuitry may retrieve a rating indicator from a user profile, where the rating indicator indicates whether the user has rated a media asset. Accordingly, when control circuitry modifies the symbol by applying a weight that is inversely correlated to the degree to which the respective search term matches the rating indicator, control circuitry may apply a substantial weight to a media asset of a search symbol that a user has not rated, and may apply a nominal weight to a media asset of a search symbol that the user has rated. Control circuitry may additionally sort the search results based on the applied weight. As an example, if the search symbol is "It's Always Sunny in Philadelphia," if a user has rated the program "It's Always Sunny in Philadelphia," related programs that have not been rated by the user (e.g., "Wilfred" is related to "It's Always Sunny in Philadelphia" because "Wilfred" shares cast members with "It's Always Sunny in Philadelphia") may appear higher in the search results than "It's Always Sunny in Philadelphia."

In some embodiments, control circuitry may access the user profile to determine an experience that occurred in a predetermined period of time, and may cause the search to be additionally based on that experience. For example, if control circuitry determines that the user recently published content (e.g., to a social media application such as Facebook) about traveling to Florida (known as the "Sunshine State"), and control circuitry detects user input of the symbol "It's Always Sunny in Philadelphia," control circuitry may retrieve and generate for display search results about Florida, as it relates to the term "Sunny" in the search symbol.

In some embodiments, control circuitry may perform another search that is based on the symbol as it was prior to modifying the symbol. For example, control circuitry may perform a search using the symbol without the weights being applied to the terms as described above. Control circuitry may then generate for display additional search results returned by the additional search, where the additional search results are generated for display simultaneously with the search results obtained by way of the modified symbol. As an example, control circuitry may generate for display a search results page that includes both a "surprise" section indicating one or more search results from the search that utilizes the modified symbol, as well as a section indicating search results that a user would expect because these results arise from an unmodified search symbol. In some embodiments, the search results from the search that were based on the modified symbol may be emphasized in some manner as compared to search results that arise from an unmodified search symbol (e.g., by being in a separate area of a page, an overlay, a popup page, or the like).

In some embodiments, control circuitry may base the search on both the modified symbol and user preferences as indicated in the user profile. For example, control circuitry may apply weight to a term as described in the foregoing, and may then tailor the search results by additionally considering the user's preferences. For example, if the search string is "It's Always Sunny in Philadelphia," and the user's preferences indicate that the user enjoy the Beatles, the search symbol may be modified to apply significant weight to the term "Sunny" because the user uses the term "sunny" infrequently, and may identify media related to the song "Here Comes the Sun," by the Beatles, as a search result based on both the weighting of the search string and the user profile.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Systems and methods are described herein for returning search results that may be rare or surprising to what a user would expect a search performed on a user-input symbol would yield. As an example, if a user were searching for media related to the television show "It's Always Sunny in Philadelphia" by entering the search symbol "It's Always Sunny in Philadelphia," the user would typically expect the search results to yield media related to that television show. However, if the user's profile indicates that the user is fascinated by astronomy, for example, the search result may also yield a result corresponding to a documentary discussing the composition of the sun.

In some aspects, control circuitry may receive a symbol comprising a plurality of terms from a user. For example, control circuitry may prompt a user to enter a search string into a search bar, and control circuitry may interpret the individual words within the search string as the terms. As another example, the control circuitry may prompt a user to drag and drop a photograph into a search tool, where control circuitry may interpret metadata associated with the photograph, or patterns within the photograph itself, as the terms.

In some embodiments, control circuitry may retrieve a user profile associated with the user. For example, control circuitry may query a database for a user profile. Control circuitry may analyze the user profile to determine one or more attributes of the user profile that are pertinent to the symbol. For example, control circuitry may analyze the user profile to determine a frequency with which a particular term of the symbol is searched by the user. As another example, control circuitry may analyze the user profile to determine a current event in the user's life, and may determine whether that current event is associated with a term of the symbol.

In some embodiments, control circuitry may modify the symbol by applying a weight to each term of the plurality of terms based on an attribute of the user profile, where the applied weight is inversely correlated to a degree to which a respective term matches the attribute of the user profile. For example, if control circuitry identifies, as an attribute of the user profile, a frequency with which terms form a part of a search symbol, control circuitry may then apply a large weight to a term that is infrequently used, and may apply a small weight to a term that is frequently used. For instance, if control circuitry receives input of a search symbol of "It's Always Sunny in Philadelphia," control circuitry may cross-reference each word of the search symbol against a user profile to determine the frequency with which each word has been part of a search symbol. Control circuitry may determine that the word "Sunny" has been in very few search symbols, whereas the other words of the search symbol are frequently used. Control circuitry may therefore apply a substantial weight to the word "Sunny" and nominal or no weight to each other word.

In some embodiments, control circuitry may perform a search based on the modified symbol. For example, control circuitry may perform a search on the weighted symbol "It's Always Sunny on Philadelphia," where the word "Sunny" is weighted substantially higher than any other word in the symbol. Control circuitry may retrieve search results based on the performed search, and may generate for display the search results. Following the example above, control circuitry may generate for display a search result based on the word "Sunny." For example, if control circuitry determines that the user enjoys documentaries about astronomy, the control circuitry may return search results including documentaries about the sun. Control circuitry may additionally return search results for the unmodified search symbol, thus likely including search results related to the television program "It's Always Sunny in Philadelphia."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 1:
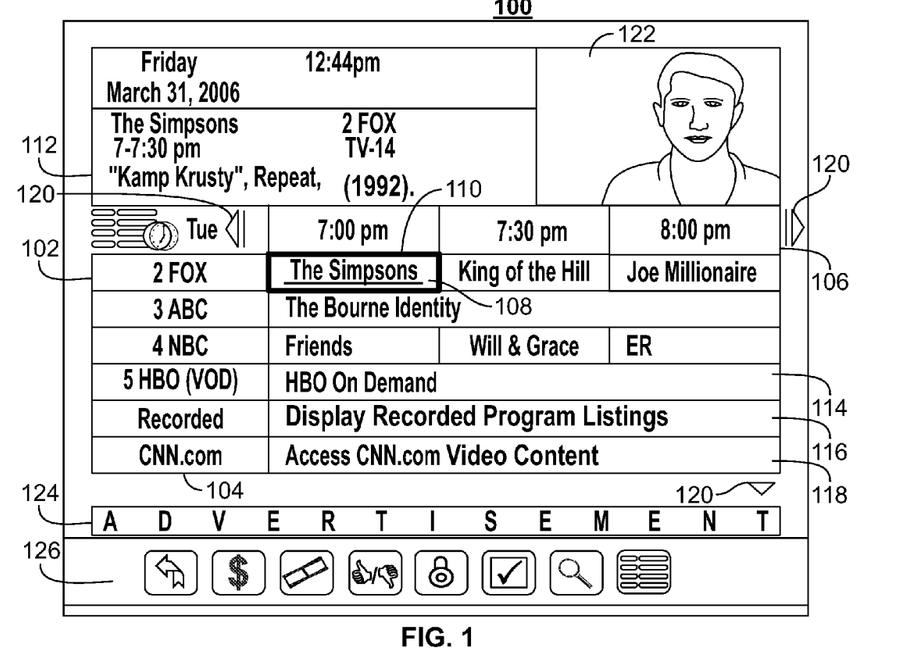
FIG. 1 shows an illustrative embodiment of a display screen that may be used to provide media guidance application listings and other media guidance information, in accordance with some embodiments of the disclosure.
Figure 2:
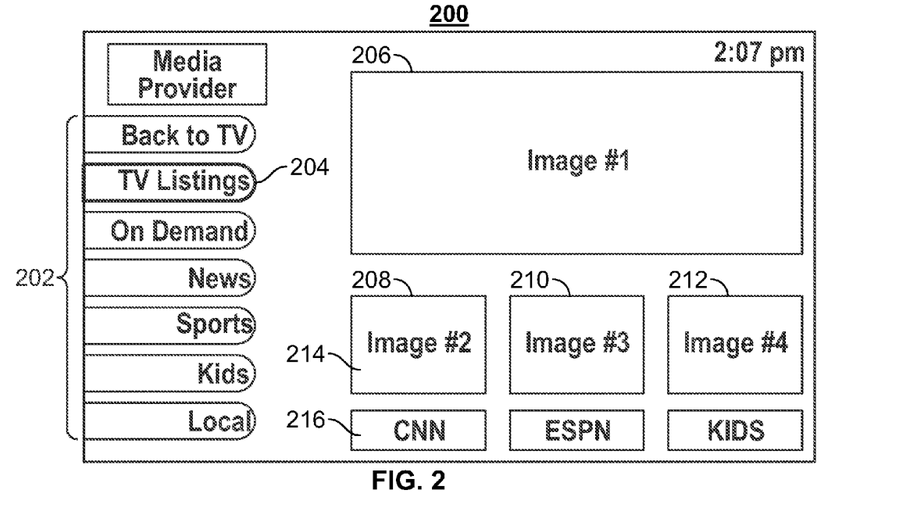
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
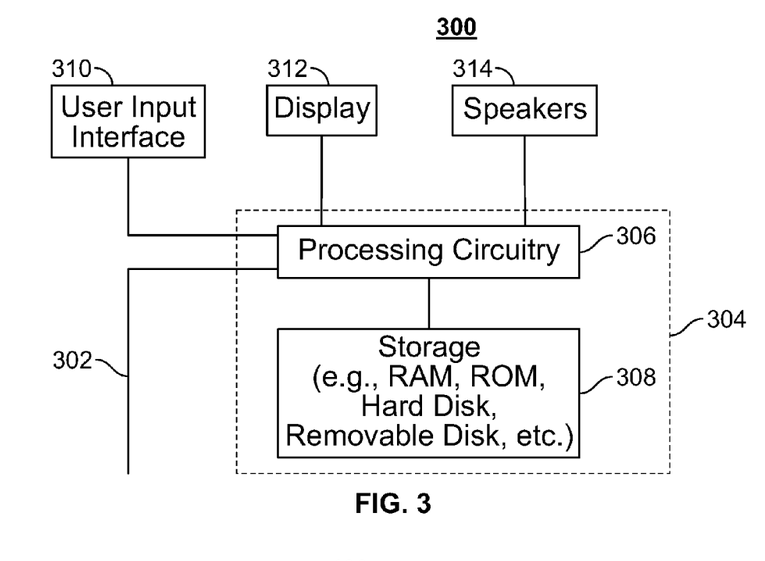
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
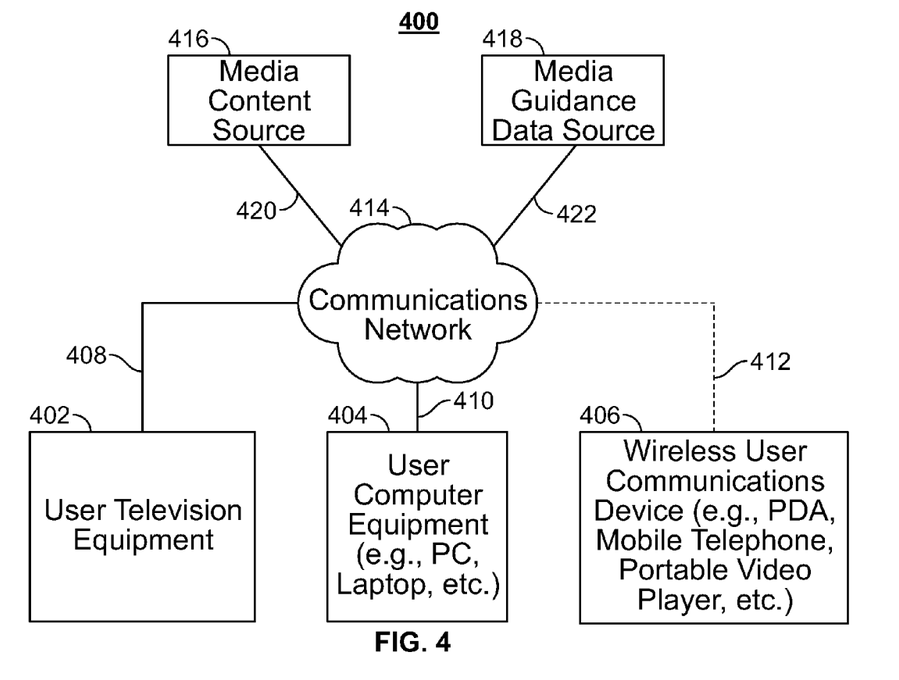
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

The term "symbol" as used herein is defined to mean any user input of any kind. Examples of symbols include text, including both a single word and strings of text, as well as images (e.g., photographs), audio (e.g., input via a microphone), video (e.g., input via a webcam or a video camera), gestures (e.g., rendered sign language), and the like.

The term "term" when used in the context of a component of a search symbol, as used herein, is defined to mean any portion of a symbol. For example, if the symbol is a string of text, a portion of the string (e.g., a word) may comprise a term. As another example, if the symbol is an image or video, any property of the image or video may comprise a term (e.g., darkness levels, quadrant of image, colors, patterns, timestamp, location stamp (e.g., geotag), etc). As yet another example, if the symbol is a gesture, any component of the gesture may comprise a term.

In some embodiments, control circuitry (e.g., control circuitry 304) may receive a symbol comprising a plurality of terms from a user, such as a search string including several words. Control circuitry 304 may retrieve a user profile associated with the user, and modify the symbol by applying a weight to each term of the plurality of terms based on an attribute of the user profile, where the applied weight is inversely correlated to a degree to which a respective term matches the attribute of the user profile. As an example, if control circuitry 304 determines, based on the user profile, that one word of a search string is rarely included in the user's search strings, control circuitry 304 may apply a large weight to that word. Subsequent to modifying the symbol, control circuitry 304 may perform a search based on the modified symbol and generate for display search results returned by the search.

Figure 5:
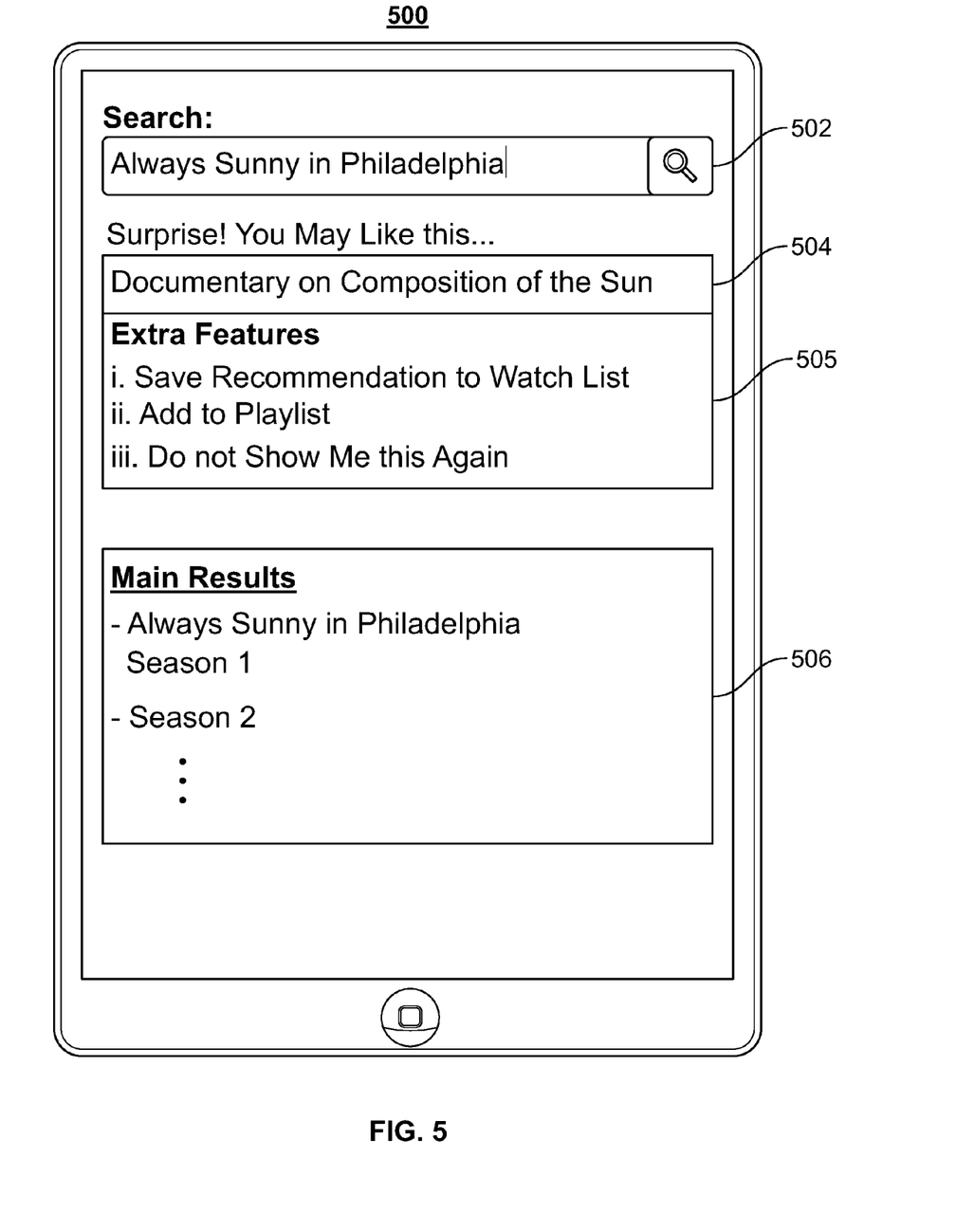
FIG. 5 shows an illustrative embodiment of a user equipment device on which a search interface is displayed, in accordance with some embodiments of the disclosure.

FIG. 5 shows an illustrative embodiment of a user equipment device on which a search interface is displayed, in accordance with some embodiments of the disclosure. User equipment 500 is depicted as a mobile device, but may be any user equipment device, including user television equipment 402, user computer equipment 404, or wireless user communications interface 406. In some embodiments, control circuitry 304 receives a symbol comprising a plurality of terms from a user. As described above and below, the symbol may comprise, for example, text, an image, a video, a gesture input, audio (e.g., voice) input, and the like. Control circuitry 304 may prompt the user (e.g., via display 312) to input a symbol into search box 502, and may receive the user input of the symbol through user input interface 310 (e.g., by receiving entry of a text string, by receiving input of an image or video by way of a drag and drop operation, and the like).

In some embodiments, control circuitry 304 may retrieve a user profile associated with the user. Control circuitry 304 may retrieve the user profile from a database (e.g., media content source 416 or media guidance data source 418). Control circuitry 304 may retrieve the user profile from media guidance data source 418 by transmitting a query to media guidance data source 418 over communications network 414. Media guidance data source 418 may reply to the query by returning the user profile or a pointer to the user profile to control circuitry 304 (e.g., by a message transmitted over communications network 414). Media guidance data source 418 may be located remotely or locally to the user equipment on which control circuitry 304 is implemented.

In some embodiments, control circuitry 304 may modify the symbol by applying a weight to each term of the plurality of terms based on an attribute of the user profile. In some embodiments, the weight applied is inversely correlated to a degree to which a respective term matches the attribute of the profile. For example, control circuitry 304 may parse the symbol into one or more terms, and then compare each term to an attribute of the user profile. An attribute of the user profile may be any indication of user preference or activity within the user profile. Examples of attributes of the user profile include a frequency that a term appears in a user's search queries, a degree to which a term matches an entry of a user profile, how recently a term appeared in a user's search queries, how often control circuitry 304 has detected the user using the term, how recently control circuitry 304 has detected the user using the term, and the like.

In some embodiments, control circuitry 304 may determine the degree to which a respective term matches the attribute of the profile by utilizing a threshold. For example, control circuitry 304 may retrieve a threshold value from media guidance data source 418, and may compare the threshold value to the attribute. As an example, if the attribute is an indication of how frequently a respective term is used in a user's search queries, the attribute may be compared to a threshold number of times a term is used in a user's search queries. The threshold may be set to only capture terms used for the very first time by a user, where whether a term was used for the very first time may be determined with reference to a period (e.g., within the last year) or without reference to a period (i.e., over the course of a lifetime). As another example, if the attribute is an indication of how recently a respective term has been used, the attribute may be compared to a threshold number of time or days prior to a present time or date since a user's last search that included the respective term. The threshold value may be bounded. For example, a threshold number corresponding to frequency of use of a term may correspond to a period of time (e.g., a threshold number of times a term has been used in the last 6 months).

Control circuitry 304 may determine that a respective term matches an attribute of the user profile when the term exceeds a threshold value, and may determine that a respective term does not match an attribute of the user profile when the term does not exceed a threshold value. Alternatively or additionally, control circuitry 304 may determine a degree to which a respective term matches the attribute of the user profile based on how frequently a user uses a term (e.g., the higher the frequency, the higher the degree) and/or how recently a user has used the term (e.g., the nearer to the date of the search query the term was last used, the higher the degree). Control circuitry 304 may apply a weight to each respective term that is inversely correlated to the degree to which a respective term matches the attribute of the user profile. As an example, if a threshold value is utilized, a term associated with an attribute that exceeds the threshold may receive a nominal or zero weight, whereas a term associated with an attribute that does not exceed the threshold may receive a significant weight. As another example, where a degree to which a respective term matches the attribute is identified without using a threshold value, as described in the foregoing, the term may be associated a weight that slides towards a small weight as the degree to which the term matches the attribute slides towards a complete match.

In some embodiments, control circuitry 304 may modify the symbol based on the applied weights as determined above. Once the weights are applied, control circuitry 304 may generate for display search results returned by the search (e.g., via display 312). Control circuitry 304 may generate for display the search results in any of SURPRISE region 504, or MAIN RESULTS region 506. As an example, control circuitry may display one or more of the search results obtained based on the modified symbol in SURPRISE region 504, such that SURPRISE region 504 represents a search result that a user may not expect to appear based on the symbol entered into search box 502. In such instances, control circuitry 304 may cause MAIN RESULTS region 506 to appear, where MAIN RESULTS region represents search results based on the symbol without modification or weight applied. Control circuitry 304 may populate SURPRISE region 504 with a search result that is listed on the same page as MAIN RESULTS 506, and may emphasize SURPRISE region 504 in any manner (e.g., by being separately listed as a "surprise" result). Alternatively, control circuitry 304 may generate for display SURPRISE region 504 in an overlay on top of MAIN RESULTS region 506, or in a popup or pop-under page relative to a page housing MAIN RESULTS region 506. Optionally, control circuitry 304 may cause SURPRISE region 504 to include EXTRA FEATURES region 505, which includes options that may be executed with respect to a search result of SURPRISE region 504. For example, if a recommendation corresponds to a video or audio asset (e.g., "Documentary on Composition of the Sun"), control circuitry 304 may display options to save the search result to a watch list or add it to a playlist. Control circuitry 304 may also enable the user to request not to be shown a particular recommendation in the future (e.g., by way of an option in EXTRA FEATURES region 505). While EXTRA FEATURES region 505 is depicted in FIG. 5 as part of a search result of SURPRISE region 504, EXTRA FEATURES region 505 may alternatively or additionally be featured in conjunction with any result of MAIN RESULTS region 506.

In some embodiments, control circuitry 304 may cause search results based on the modified symbol to appear in the MAIN RESULTS region 506. Control circuitry 304 may do this, e.g., when a user selects SURPRISE region 504, in which case a user may be led to view the full set of search results of the search based on the modified symbol as the main results.

In some embodiments, control circuitry 304 may sort the search results based on attributes of the user profile. For example, once search results are returned by a search based on the modified symbol, control circuitry 304 may compare the search results to an attribute of the user profile and may sort the search results based on the attribute. In some embodiments, control circuitry 304 may sort the search results in the same manner as it weights the terms of the search symbol (e.g., by inverse correlation). In some embodiments, control circuitry 304 may sort the search results in the opposite manner as it weights the terms of the search symbol (e.g., by non-inverse correlation).

As an example, if the search symbol is "It's Always Sunny in Philadelphia," and if control circuitry 304 determines that the term "Sunny" rarely is used by the user, control circuitry 304 may weight the search term "Sunny" with a substantial applied weight. Subsequently, control circuitry 304 may return search results in SURPRISE region 504 including search results corresponding to the term "Sunny," such as a documentary of the composition of the sun, or a media asset discussing the state of Florida (known as the "Sunshine State"). The search results may be ranked such that results that correspond to the user's preferences as indicated in the user profile (e.g., the documentary of the composition of the sun if control circuitry 304 determines that the user has a history of viewing documentaries or enjoys astronomy) are higher or lower on a list of search results in SURPRISE region 504 depending on whether control circuitry 304 applies an inverse correlation or a non-inverse correlation. In some embodiments, the ranking or sorting of the search results may be based on recent experiences by the user. For example, control circuitry 304 may determine that the user recently visited the state of Florida, and thus may rank the media asset discussing the state of Florida more highly.

In some embodiments, control circuitry 304 may receive a search symbol from a user. Control circuitry 304 may retrieve a user profile associated with the user, and may step through each term of the symbol to determine a weight to apply to each term of the symbol. Control circuitry 304 may apply each determined weight to each respective term of the symbol, perform a search based on the modified symbol, and generate for display the search results.

Figure 6:
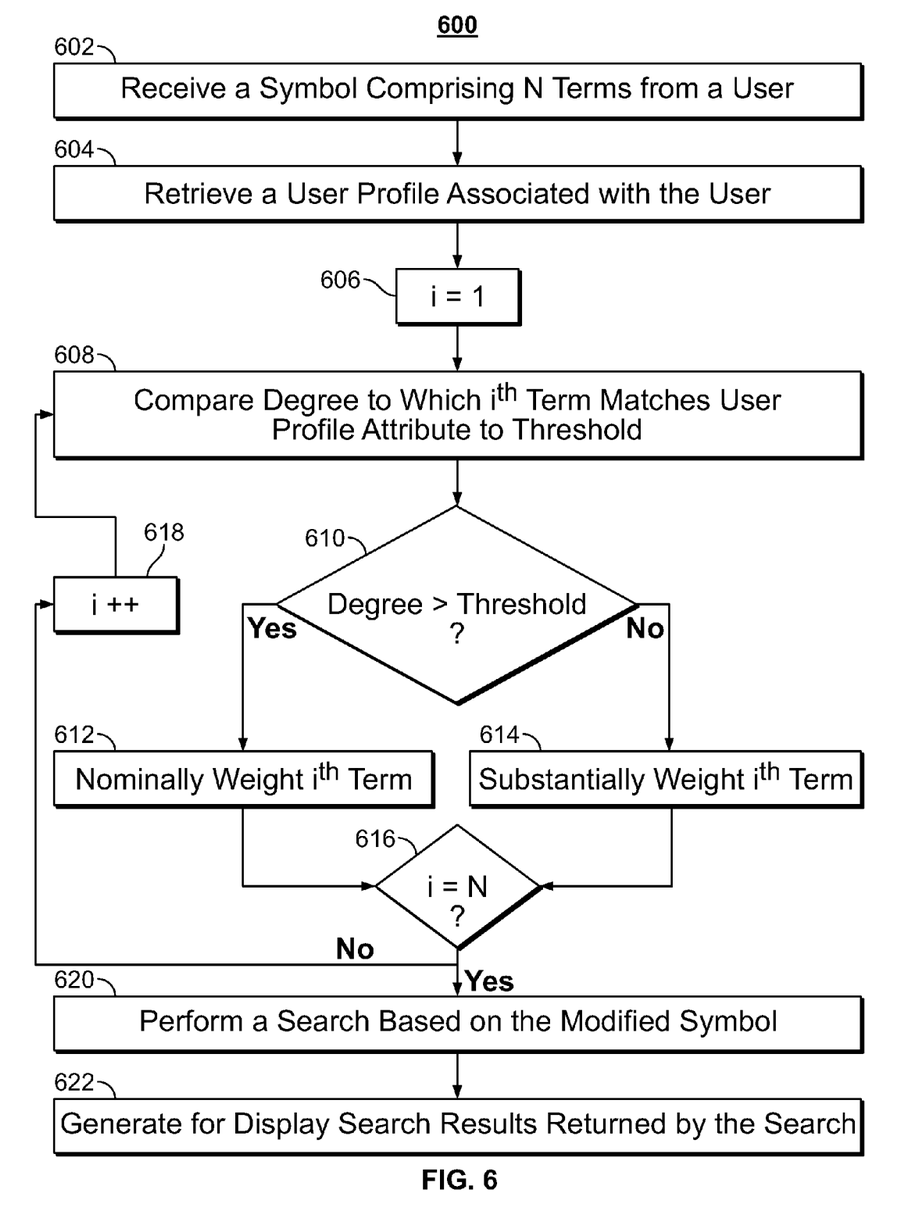
FIG. 6 is a flowchart of illustrative steps involved in determining which term(s) of a symbol to weight, in accordance with some embodiments of the disclosure.

FIG. 6 is a flowchart of illustrative steps involved in determining which term(s) of a symbol to weight, in accordance with some embodiments of the disclosure. It should be noted that process 600 or any step thereof could be performed on, or provided by, any of the devices shown in FIGS. 3-5. For example, process 700 may be executed by control circuitry 304 (FIG. 3) as instructed by control circuitry implemented on user equipment 402, 404, and/or 406 (FIG. 4) in order to determine whether to use a user-selected or automatically selected avatar to communicate information. In addition, one or more steps of process 600 may be incorporated into or combined with one or more steps of any other process or embodiment.

Process 600 begins at 602, where control circuitry 304 receives a symbol comprising N terms from a user. For example, control circuitry 304 may prompt the user (e.g., via display 312) to input a symbol into search box 502, and may receive the user input of the symbol through user input interface 310 (e.g., by receiving entry of a text string, by receiving input of an image or video by way of a drag and drop operation, and the like).

At 604, control circuitry 304 may retrieve a user profile associated with the user. Control circuitry 304 may retrieve the user profile from media guidance data source 418 by transmitting a query to media guidance data source 418 over communications network 414. Media guidance data source 418 may reply to the query by returning the user profile or a pointer to the user profile to control circuitry 304 (e.g., by a message transmitted over communications network 414). Media guidance data source 418 may be located remotely or locally to the user equipment on which control circuitry 304 is implemented.

At 606, control circuitry 304 may initialize a counter by setting the counter equal to 1, for the purposes of analyzing each term of the symbol in turn. At 608, control circuitry 304 may compare the degree to which a respective term of the symbol matches an attribute of the user profile to a threshold value. An attribute of the user profile may be any indication of user preference or activity within the user profile. Examples of attributes of the user profile include a frequency that a term appears in a user's search queries, a degree to which a term matches an entry of a user profile, how recently a term appeared in a user's search queries, how often control circuitry 304 has detected the user using the term, how recently control circuitry 304 has detected the user using the term, and the like.

At 608, control circuitry 304 may determine the degree to which a respective term matches the attribute of the profile by utilizing a threshold. For example, control circuitry 304 may retrieve a threshold value from media guidance data source 418, and may compare the threshold value to the attribute. As an example, if the attribute is an indication of how frequently a respective term is used in a user's search queries, the attribute may be compared to a threshold number of times the times a term is used in a user's search queries. As another example, if the attribute is an indication of how recently a respective term has been used, the attribute may be compared to a threshold number of time or days prior to a present time or date since a user's last search that included the respective term. The threshold value may be bounded. For example, a threshold number corresponding to frequency of use of a term may correspond to a period of time (e.g., a threshold number of times a term has been used in the last 6 months).

At 610, control circuitry 304 determines whether the degree to which the respective term matches the user profile attribute equals or exceeds the threshold. If control circuitry 304 determines that the degree to which the respective term matches the user profile attribute does exceed the threshold, process 600 proceeds to 612, where control circuitry 304 causes the term to be nominally weighted. Control circuitry 304 may nominally weight the term by applying a weight of zero to the term, by refraining from changing the weight of the term, or by weighting it an amount based on how far above the threshold the degree is. If control circuitry 304 determines that the degree to which the respective term matches the user profile attribute does not exceed the threshold, process 600 proceeds to 614, where control circuitry 304 substantially weights the respective term. Control circuitry 304 may substantially weight the term by applying a weight to the term that makes the term significantly more influential over a search than terms that are not substantially weighted. For example, control circuitry 304 may assign a multiplier (e.g., double, triple, etc) to the term's current weight, or may alternatively only weight terms where the degree does not exceed the threshold.

Subsequent to weighting a respective term, process 600 proceeds to 616, where control circuitry 304 determines whether each term has been stepped through. If each term has not been stepped through, control circuitry 304 increments the counter at 618, and 606-616 are repeated. If each term has been stepped through, process 600 proceeds to 620, where control circuitry 304 performs a search based on the modified symbol. As an example, if the symbol is "It's Always Sunny in Philadelphia," and control circuitry 304 determines that the user rarely searches the word "Sunny," control circuitry 304 may weight the term "Sunny" substantially, such that the search yields results relating to the term "Sunny."

Process 600 next proceeds to 622, where control circuitry 304 generates for display search results returned by the search. The search results may be generated for display in SURPRISE region 504 or MAIN RESULTS region 506, as displayed through display 312. In the example where the symbol is "It's Always Sunny in Philadelphia," where the term "Sunny" is weighted, the search results may comprise documentaries about the sun, media assets about the state of Florida (i.e., "the Sunshine State"), weather forecasts, and the like. As described above and below, control circuitry 304 may sort or rank the search results based on information in the user profile, such as user profile preferences or recent occurrences in a user's life as reflected by the user profile.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determination of the degree to which a relative term matches a user profile attribute may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the user profile information as described herein may be stored in, and retrieved from, storage 308 of FIG. 3, or media guidance data source 418 of FIG. 4. Furthermore, processing circuitry, or a computer program, may update settings associated with a user, such as a user-selected first or second threshold, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing feedback to a user, the method comprising:
receiving a symbol comprising a plurality of terms from a user;
retrieving a user profile associated with the user;
modifying the symbol by applying a weight to each term of the plurality of terms based on an attribute of the user profile, wherein the applied weight is inversely correlated to a degree to which a respective term matches the attribute of the user profile;
performing a search based on the modified symbol;
generating for display search results returned by the search;
performing another search that is based on the symbol as it was prior to modifying the symbol; and
generating for display additional search results returned by the another search, wherein a search result of the search results generated for display based on the search performed based on the modified symbol is generated for display simultaneously with the additional search results.

2. The method of claim 1, wherein the degree to which the respective term matches the attribute of the user profile is determined based on a frequency indicator indicating how often each term has historically been used by the user.

3. The method of claim 2, wherein applying the weight to each term of the plurality of terms further comprises:
comparing the frequency indicator corresponding to the respective term to a threshold; and
determining whether the frequency indicator corresponding to the respective term exceeds a threshold, wherein:
in response to determining the frequency indicator exceeds the threshold, the applied weight is nominal, and wherein
in response to determining the frequency indicator does not exceed the threshold, the applied weight is substantial.

4. The method of claim 1, wherein the search results are sorted based on preferences indicated by the user profile.

5. The method of claim 1, wherein performing the search further comprises accessing the user profile to determine an experience that occurred in a predetermined period of time, and causing the search to be additionally based on the experience.

6. The method of claim 1, wherein the search result is displayed in an emphasized manner as compared to the display of the additional search results.

7. The method of claim 6, wherein the search result is displayed in an overlay on top of the additional search results.

8. The method of claim 1, wherein the search is based on both the modified symbol and user preferences as indicated in the user profile.

9. The method of claim 1, further comprising:
accessing a database, wherein the user profile is retrieved from the database;
cross-referencing the symbol with the user profile; and
determining the degree to which the respective term matches the attribute of the user profile based on the cross-referencing.

10. A system for providing feedback to a user, the system comprising:
user input circuitry;
communications circuitry; and
control circuitry configured to:
receive, using the user input circuitry, a symbol comprising a plurality of terms from a user;
retrieve, using the communications circuitry, a user profile associated with the user;
modify the symbol by applying a weight to each term of the plurality of terms based on an attribute of the user profile, wherein the applied weight is inversely correlated to a degree to which a respective term matches the attribute of the user profile;
perform a search based on the modified symbol;
generate for display search results returned by the search;
perform another search that is based on the symbol as it was prior to modifying the symbol; and
generate for display additional search results returned by the another search, wherein a search result of the search results generated for display based on the search performed based on the modified symbol is generated for display simultaneously with the additional search results.

11. The system of claim 10, wherein the control circuitry is further configured to, when determining the degree to which the respective term matches the attribute of the user profile, base the determination on a frequency indicator indicating how often each term has historically been used by the user.

12. The system of claim 11, wherein the control circuitry is further configured, when applying the weight to each term of the plurality of terms, to:
compare the frequency indicator corresponding to the respective term to a threshold; and
determine whether the frequency indicator corresponding to the respective term exceeds a threshold, wherein:
in response to determining the frequency indicator exceeds the threshold, the applied weight is nominal, and wherein
in response to determining the frequency indicator does not exceed the threshold, the applied weight is substantial.

13. The system of claim 10, wherein the control circuitry is further configured to sort the search results based on preferences indicated by the user profile.

14. The system of claim 10, wherein control circuitry is further configured to, when performing the search, access the user profile to determine an experience that occurred in a predetermined period of time, and cause the search to be additionally based on the experience.

15. The system of claim 10, wherein the search result is displayed in an emphasized manner as compared to the display of the additional search results.

16. The system of claim 15, wherein the search result is displayed in an overlay on top of the additional search results.

17. The system of claim 10, wherein the search is based on both the modified symbol and user preferences as indicated in the user profile.

18. The system of claim 10, wherein the control circuitry is further configured to:

access, using the communications circuitry, a database, wherein the user profile is retrieved from the database;
cross-reference the symbol with the user profile; and
determine the degree to which the respective term matches the attribute of the user profile based on the cross-referencing.

* * * * *